(12) United States Patent
Zhang et al.

(10) Patent No.: US 12,229,838 B2
(45) Date of Patent: Feb. 18, 2025

(54) METHOD AND DEVICE FOR DETERMINING SOCIAL RANK OF NODE IN SOCIAL NETWORK

(71) Applicant: TENCENT TECHNOLOGY (SHENZHEN) COMPANY LIMITED, Shenzhen (CN)

(72) Inventors: Xu Zhang, Shenzhen (CN); Leyu Lin, Shenzhen (CN); Jing Zhang, Shenzhen (CN); Kaikai Ge, Shenzhen (CN); Kai Zhuang, Shenzhen (CN); Xin Chen, Shenzhen (CN); Wei Wang, Shenzhen (CN); Su Yan, Shenzhen (CN); Yudan Liu, Shenzhen (CN); Linyao Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 542 days.

(21) Appl. No.: 17/352,221

(22) Filed: Jun. 18, 2021

(65) Prior Publication Data
US 2021/0311941 A1 Oct. 7, 2021

Related U.S. Application Data

(63) Continuation of application No. PCT/CN2019/126693, filed on Dec. 19, 2019.

(30) Foreign Application Priority Data

Dec. 21, 2018 (CN) .......................... 201811573099.9

(51) Int. Cl.
G06Q 50/00 (2024.01)
G06F 16/2458 (2019.01)

(52) U.S. Cl.
CPC ......... *G06Q 50/01* (2013.01); *G06F 16/2465* (2019.01)

(58) Field of Classification Search
None
See application file for complete search history.

(56) References Cited

U.S. PATENT DOCUMENTS

2014/0372175 A1\* 12/2014 Jain .................... G06Q 30/0202
  705/7.31
2015/0074198 A1\* 3/2015 Liu ........................ G06Q 50/01
  709/204

(Continued)

FOREIGN PATENT DOCUMENTS

CN 103488678 A 1/2014
CN 104598605 A 5/2015

(Continued)

OTHER PUBLICATIONS

The World Intellectual Property Organization (WIPO) International Search Report for PCT/CN2019/126693 Mar. 25, 2020 6 Pages (including translation).

*Primary Examiner* — Giuseppi Giuliani
(74) *Attorney, Agent, or Firm* — ANOVA LAW GROUP, PLLC

(57) ABSTRACT

A method is provided for determining a social rank of a node in a social network, the social network including a plurality of nodes connected by relationship chains. The method includes determining a user corresponding to at least one of the plurality of nodes in the social network, determining a connection structure of the relationship chains between the plurality of nodes, and determining, according to the connection structure of the relationship chains between the plurality of nodes, a social rank of the user corresponding to the at least one of the plurality of nodes.

16 Claims, 8 Drawing Sheets

(56) References Cited

U.S. PATENT DOCUMENTS

| | | | |
|---|---|---|---|
| 2015/0120717 A1 | 4/2015 | Kim et al. | |
| 2015/0180940 A1* | 6/2015 | Kozloski | H04L 67/10 709/204 |
| 2015/0254890 A1* | 9/2015 | Noma | H04L 9/0643 345/419 |
| 2019/0266257 A1* | 8/2019 | Natchu | G06F 16/137 |
| 2019/0286657 A1* | 9/2019 | Li | G06F 18/29 |
| 2021/0201863 A1* | 7/2021 | Bosch Vicente | G10H 1/36 |

FOREIGN PATENT DOCUMENTS

| | | |
|---|---|---|
| CN | 106354783 A | 1/2017 |
| CN | 107016603 A | 8/2017 |
| CN | 107767278 A | 3/2018 |
| CN | 108537636 A | 9/2018 |
| CN | 109034562 A | 12/2018 |

\* cited by examiner

METHOD AND DEVICE FOR DETERMINING SOCIAL RANK OF NODE IN SOCIAL NETWORK

RELATED APPLICATIONS

This application is a continuation application of PCT Patent Application No. PCT/CN2019/126693, filed on Dec. 19, 2019, which claims priority to Chinese Patent Application No. 201811573099.9, entitled "METHOD AND DEVICE FOR DETERMINING SOCIAL RANK OF NODE IN SOCIAL NETWORK" and filed on Dec. 21, 2018, all of which are incorporated herein by reference in entirety.

FIELD OF THE TECHNOLOGY

The present disclosure relates to the field of data mining, and relates to a method, device, and apparatus for determining a social rank of a node in a social network, and a computer-readable medium.

BACKGROUND

User portrait is a tool for describing a target user and determining user attributes. For example, data related to user behavior and activities may be collected with support of big data, and user characteristics are determined according to the data. The characteristics may depict an image of a user, for example, a population attribute, asset features, and interests and hobbies of the user. For a specific user, a corresponding user portrait may be determined by collecting a large amount of specific information related to user behavior, so that operations performed on the user may be more effective.

SUMMARY

Embodiments of the present disclosure provide a method, device, and apparatus for determining a social rank of a node in a social network, and a computer-readable medium.

One aspect of the present disclosure provides for determining a social rank of a node in a social network is provided, the social network including a plurality of nodes connected by relationship chains. The method includes determining a user corresponding to at least one of the plurality of nodes in the social network, determining a connection structure of the relationship chains between the plurality of nodes, and determining, according to the connection structure of the relationship chains between the plurality of nodes, a social rank of the user corresponding to the at least one of the plurality of nodes.

Another aspect of the present disclosure provides a device for determining a social rank of a node in a social network, the social network including a plurality of nodes connected by relationship chains, the device includes a memory a memory storing computer program instructions, and a processor coupled to the memory and configured to executing the computer program instructions and perform determining a user corresponding to at least one of the plurality of nodes in the social network, determining a connection structure of the relationship chains between the plurality of nodes, determining, according to the connection structure of the relationship chains between the plurality of nodes, a social rank of the user corresponding to the at least one of the plurality of nodes.

Yet another aspect of the present disclosure provides a non-transitory computer-readable storage medium. The non-transitory computer-readable storage medium stores computer program instructions executable by at least one processor to perform determining a user corresponding to at least one of the plurality of nodes in a social network, the social network including a plurality of nodes connected by relationship chains, determining a connection structure of the relationship chains between the plurality of nodes, and determining, according to the connection structure of the relationship chains between the plurality of nodes, a social rank of the user corresponding to the at least one of the plurality of nodes.

According to the method, device, and apparatus for determining a social rank of a node in a social network and the computer-readable medium, the connection structure of the relationship chains between the plurality of nodes is determined; and a social rank of a user corresponding to at least one of the plurality of nodes is determined according to the connection structure of the relationship chains between the plurality of nodes, so that greater data coverage can be implemented in a process of estimating a user social rank, thereby obtaining a more accurate user portrait.

Other aspects of the present disclosure can be understood by those skilled in the art in light of the description, the claims, and the drawings of the present disclosure.

BRIEF DESCRIPTION OF THE DRAWINGS

To more clearly describe technical solutions of certain embodiments of the present disclosure, described below are accompanying drawings. The accompanying drawings are illustrative of embodiments of the present disclosure, and a person of ordinary skill in the art may still derive other drawings from these accompanying drawings without having to exert creative efforts. The accompanying drawings are not necessarily drawn to scale.

DETAILED DESCRIPTION

To make objectives, technical solutions, and advantages of the present disclosure clearer and more comprehensible, certain embodiments of the present disclosure are further elaborated in detail with reference to the accompanying drawings. The described embodiments are not to be construed as a limitation to embodiments of the present disclosure. All other embodiments obtained by a person of ordinary skill in the art without creative efforts shall fall within the protection scope of embodiments of the present disclosure.

As described above, a user portrait may be used for describing characteristics of a user. The user characteristics may be useful in certain Internet products. For example, in the health field, requirements from a retired elderly may be totally different than requirements from a senior executive. Therefore, corresponding content may be pushed to the user according to the user characteristics, to implement more efficient information distribution.

In certain existing methodologies, the user portrait is mainly determined by using collected individual information of the user. For example, with support of big data, the user portrait may be obtained by using information such as browsing records, expense records, individual information, and geographical locations of the user. However, collection of the individual information is limited by data coverage in these existing methodologies. In other words, when user information in some aspect is missing, the user portrait of the user may be incomplete.

Therefore, the present disclosure provides a method for determining a social rank of a user by using a social relationship of the user in a social network. The social rank determined based on the social network can help to describe a user portrait, because social relationships of almost all users in the social network can be determined in the social network comprehensively by using relationship chains between the users, to achieve much greater data coverage. Therefore, when a user portrait is determined by using a social relationship, for characteristic requirements, a target user may be determined more comprehensively.

For example, a rank of the user in the social network may be determined by using a statistical result of social ranks of all friends of the user. In this case, there is no need to obtain any individual information and behavior features of the user, but instead, the social rank of the user may be determined depending on a friend relationship of the user in the social network.

In another example, further, the rank of the user in the social network may further be determined by using information about a group related to the user as additional information. For example, an importance of the group related to the user in the social network may be determined, and the rank of the user in the social network is further determined based on the importance of the group related to the user.

Figure 1:
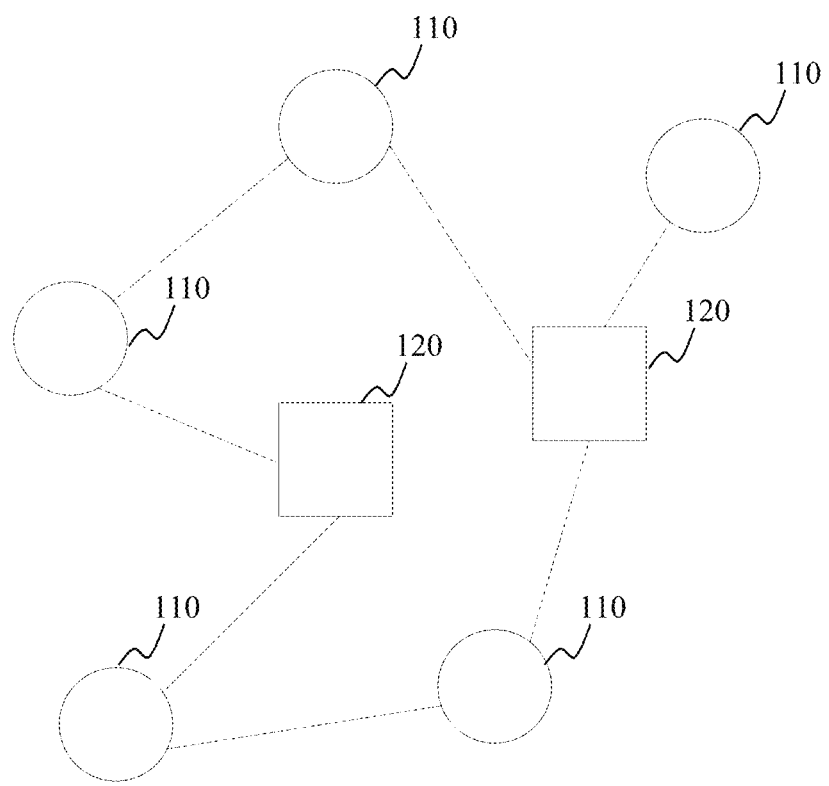
FIG. 1 is a schematic diagram of a social network according to an embodiment of the present disclosure.

FIG. 1 is a schematic diagram of a social network according to an embodiment of the present disclosure. As shown in FIG. 1, the social network is a network including a plurality of nodes connected to each other. The node mentioned herein may represent an individual user, or may represent a group. The group may be a set including a plurality of individual users, for example, a chat group including a plurality of individual users, or an official account followed by a plurality of individual users. In FIG. 1, a round node 110 represents an individual user, and a square node 120 represents a group. Although only five individual users and two groups are shown in FIG. 1, it may be understood that, a social network including any quantity of individual users and any quantity of groups may be determined in a similar manner. There are a plurality of relationship chains in the social network, and each relationship chain is used for connecting two nodes in the network. As shown in FIG. 1, a dashed line connecting two nodes represents such a relationship chain. The relationship chain may be used for representing a social relationship between the nodes. For example, when two nodes both represent individual users, a relationship chain between the two nodes may be used for representing that the two individual users are friends to each other. When one of the two nodes represents an individual user, the other represents a group, a relationship chain between the two nodes may be used for representing that the individual user joins the group. For example, the individual user joins the chat group, or follows the official account.

The social rank refers to a level of the user in the social network. For example, a user that meets one or more features of a relatively large age and a relatively high position in the social network may be determined to be at an elite level. Similarly, a user that meets one or more features of an intermediate age and an intermediate position in the social network may be determined to be at an intermediate level, and a user that meets one or more features of a relatively small age, a relatively low position, and having no job in the social network is determined to be at an ordinary level.

As described above, because a large quantity of users are included in the social network, it is difficult to determine social ranks of the users by completely obtaining information related to each user.

Therefore, to estimate the social ranks of the users more accurately, social relationships of the users in the social network may be used as a criterion for estimating the social ranks of the users. User correlations in the social network may be used to mine the social ranks of the users. The user correlation may be determined by using one or more of a similarity between a user and a friend of the user and a similarity between the user and a group that the user joins. It may be understood that, a social circle of a person usually matches a social rank of the person. Therefore, the social rank of the user may be predicted properly by using statistics of social ranks of friends of the user and groups that the user joins.

Figure 2A:
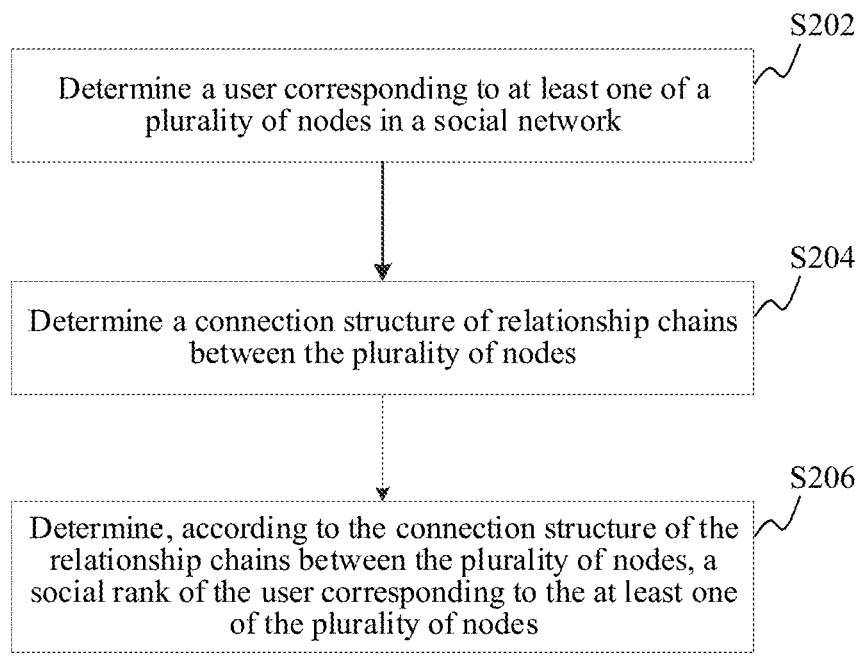
FIG. 2A is a flowchart of a method for determining a social rank of a node in a social network according to an embodiment of the present disclosure.

FIG. 2A shows a method for determining a social rank of a node in a social network according to an embodiment of the present disclosure. As shown in FIG. 2A, at step S202, a user corresponding to at least one of a plurality of nodes in the social network is determined. In this case, the user may be ranked by determining a social rank of each node in the social network. For example, social ranks of two nodes may be compared, and it is considered that a higher social rank of a node indicates a higher rank of a user corresponding to the node in the social network.

At step S204, a connection structure of relationship chains between the plurality of nodes may be determined. As shown in FIG. 1, the social network includes a plurality of nodes connected to each other by using relationship chains. Therefore, connection manners of the relationship chains between the nodes may represent social modes of the nodes in the social network, and comprehensive social relationships related to the nodes in the social network can be obtained.

At step S206, a social rank of the user corresponding to the at least one of the plurality of nodes may be determined according to the connection structure of the relationship chains between the plurality of nodes. Relationship chains of a node in the social network reflect social relationships between the node and other nodes in the social network. Therefore, by using the method provided in the present disclosure, a user may be ranked based on the social relationships in the social network.

In one or more embodiments of the present disclosure, the term "based on" is employed herein interchangeably with the term "according to."

After the social rank of the user is determined, a user specific operation may be performed for the user based on the social rank of the user. For example, a plurality of nodes in a social network may be classified according to a result obtained by the method shown in FIG. 2A. During implementation, the social rank may be embodied in a numerical form, to visually distinguish differences between different social ranks. For example, a social rank of a node at an elite level (also referred to as an "elite node" below) is determined to be 1, and a social rank of a node at an ordinary level (also referred to as an "ordinary node" below) is determined to be 0. Social ranks of the nodes in the social network are distributed between 0 and 1. The nodes may be classified based on the social ranks of the nodes. For example, a node with a social rank between 0 and 0.3 is determined to be of an ordinary class, a node with a social rank between 0.3 and 0.7 is determined to be of an intermediate class, and a node with a social rank between 0.7 and 1 is determined to be of an elite class.

For two nodes having the same social rank in the plurality of nodes (that is, values of the social ranks of the two nodes are the same or the social ranks of the two nodes are in the same class), the same operation, such as, distribution or recall of the same content, may be performed for users represented by the two nodes.

By using the method provided in the present disclosure, the rank of the user in the social network may be determined based on social relationships of each user in the social network, so that the user can be ranked, and characteristics of the user are depicted by using a ranking result.

Figure 2B:
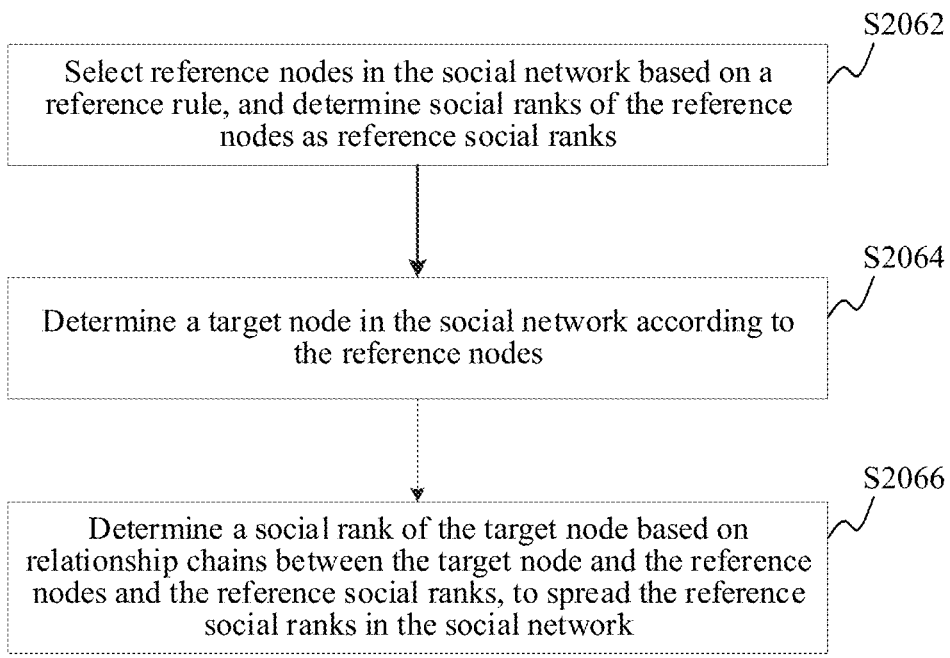
FIG. 2B is a flowchart of a method for determining a social rank of a node according to a social relationship according to an embodiment of the present disclosure.

FIG. 2B is a flowchart of a method for determining a social rank of a node according to an embodiment of the present disclosure. As shown in FIG. 2B, at step S2062, reference nodes may be selected in the social network based on a reference rule, and social ranks of the reference nodes are determined as reference social ranks.

To estimate the social rank of the user represented by the node in the social network, first, some reference nodes in the social network need to be selected as a criterion for evaluating the social rank of the user. Then, social ranks of other nodes in the social network can be determined by spreading the social ranks of the reference nodes to the entire social network. The reference nodes are also referred to as "seed nodes". Some of the plurality of nodes in the social network may be selected as reference nodes based on the reference rule, and social ranks of the reference nodes are determined. In other words, some nodes in the social network are selected by using the reference rule, and social ranks of the selected nodes are determined as reference values, so that social ranks of other nodes in the social network may be determined based on the reference values.

In some embodiments, the reference nodes may be elite nodes. Social ranks of the elite nodes may be determined as a first reference value, for example, 1, or any other value. In some other embodiments, the reference nodes may alternatively be ordinary nodes. Social ranks of the ordinary nodes may be determined as a second reference value, for example, 0, or any other value. In still some other embodiments, the reference nodes may include a combination of an elite node and an ordinary node. A value of a social rank of the elite node may be greater than a value of a social rank of the ordinary node. It may be understood that, in fact, any quantity of reference nodes may be selected in the social network according to the reference rule, and social ranks of the reference nodes are determined as the same or different reference values.

In some embodiments, a node may be directly determined as a reference node based on the reference rule. For example, when a user corresponding to a node meets one or more of the following: an age being greater than a reference threshold, a position being higher than a reference threshold, and an income being greater than a reference threshold, the node may be directly determined as an elite node. In another example, when a user corresponding to a node meets one or more of the following: living in a specific city, having no job, an income being less than a threshold, and having a bad credit record, the node may be directly determined as an ordinary node.

In some other embodiments, some of the plurality of nodes in the social network may be selected as candidate reference nodes based on a candidate condition, and one or more of the nodes are determined as reference nodes according to similarities between the candidate reference nodes. A process of determining the reference nodes based on the candidate reference nodes is described in detail below with reference to FIG. 3.

At step S2064, a target node may be determined in the social network according to the reference nodes. In some embodiments, all the nodes in the social network except the reference nodes may be determined as target nodes. In some other embodiments, some of the nodes in the social network except the reference nodes may be determined as target nodes.

At step S2066, a social rank of the target node may be determined based on relationship chains between the target node and the reference nodes and the reference social ranks. The reference social rank may be spread in the social network by performing step S2066. As described above, a social rank of a user may be predicted properly by using a social rank of a social circle of the user. Therefore, the social rank of the target node may be determined according to the social ranks of the reference nodes predetermined at step S2062 and the relationship chains between the target node and the reference nodes.

In some embodiments, an average value of social ranks of neighboring nodes of the target node may be determined as the social rank of the target node, the neighboring node being a node connected to the target node by using a relationship chain. When each of the plurality of nodes in the social network represents a user, a neighboring node represents a friend, which means that a social rank of the user may be determined according to a social rank of the friend of the user. For example, an average value of social ranks of neighboring nodes of a target node may be determined as a social rank of the target node. The average value mentioned herein may be any statistical average value such as an arithmetic average value, a geometric average value, a square mean, a harmonic average value, or a weighted average value.

When the social rank of the neighboring node of the target node is determined, if the neighboring node is a reference node, the social rank of the neighboring node is set to a reference value. If the neighboring node is not a reference node, the social rank of the neighboring node may be set to a default value. For example, the reference nodes include elite nodes having the first reference value, and then the default value may be set to any value less than the first reference value. If the reference nodes include ordinary nodes having the second reference value, and then the default value may be set to any value greater than the second reference value. If the reference nodes include both an elite node having the first reference value and an ordinary node having the second reference value, and then the default value may be set to any value greater than the second reference value and less than the first reference value.

In some implementations, when the social rank of the target node is determined, a limited quantity of iterations may be performed. In other words, all the target nodes in the social network may be processed to determine the social ranks of the target nodes. Then, the social ranks of the processed target nodes may be updated to a result of the processing, and based on the updated result, the social ranks of the target nodes are determined according to social ranks of neighboring nodes of the target nodes.

For example, during the first processing, the social ranks of the reference nodes in the social network are determined to be the reference value (such as, the first reference value 1 and the second reference value 0 mentioned above), and social ranks of other nodes are determined to be the default value. During the second processing, the social ranks of the other nodes in the social network may be updated to a result obtained after the first processing. The rest may be deduced by analogy.

For example, for any node A, supposing that neighboring nodes of the node A include two reference nodes, whose reference values are respectively 0 and 1, and two non-reference nodes, during the first processing, a social rank of the node A may be determined to be A=(1+0+0+0)/4=0.25. Supposing that social ranks of the non-reference nodes of A after the first processing are respectively determined to be 0.3 and 0.5, during the second processing, the social rank of the node A may be determined to be A=(1+0+0.3+0.5)/4=0.45.

Therefore, according to the method provided in this embodiment of the present disclosure, when the social rank of the target node is determined, impact brought by the social ranks of the non-reference nodes in the neighboring nodes of the target node can be considered.

By using the method for determining a social rank of a node in a social network according to this embodiment of the present disclosure, the social ranks of the other nodes in the social network may be determined according to the relationship chains in the social network and the reference social ranks of the reference nodes, so that the social rank of the user is estimated more comprehensively.

Figure 3:
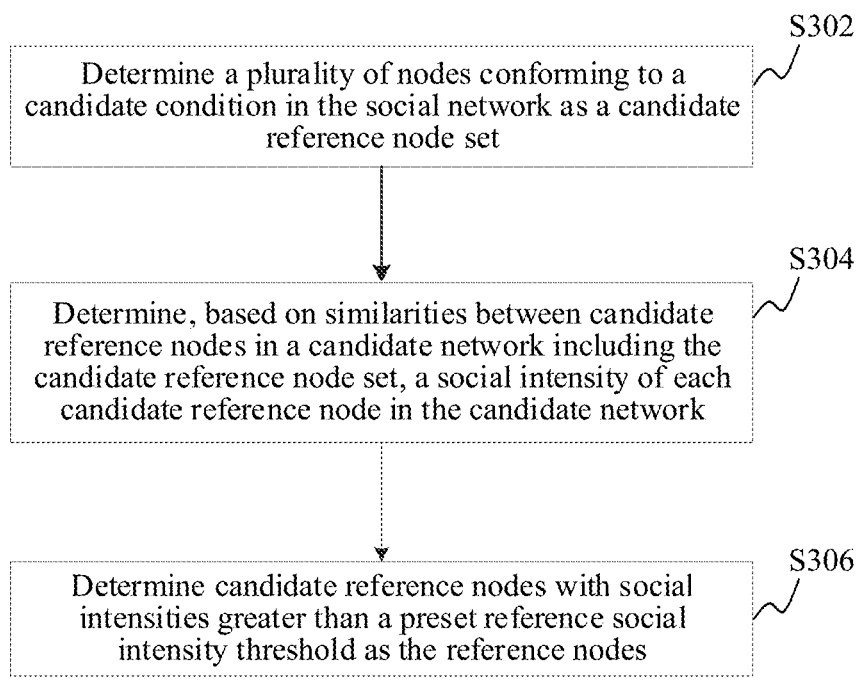
FIG. 3 is a flowchart of a method for determining reference nodes according to an embodiment of the present disclosure.

The social rank of the user determined by using the foregoing method may be tested. For example, for a user in an enterprise, it can be considered that a higher social rank of a node may indicate a higher position of the user. Accuracy that the social rank of the node obtained by using the foregoing method conforms to a position level of the user in the enterprise can reach 80%. FIG. 3 is a flowchart of a method for determining reference nodes according to an embodiment of the present disclosure. The following description is made by using an example in which reference nodes are determined as elite nodes.

As shown in FIG. 3, the method 300 may include step S302, in which a plurality of nodes conforming to a candidate condition in the social network are determined as a candidate reference node set. In some embodiments, the candidate condition may be that a user age corresponding to a node is greater than a reference threshold. For example, when the social network is an enterprise community, users corresponding to the nodes in the social network may be sorted according to ages, and nodes corresponding to the first 10% of users with higher ages are determined as candidate reference nodes. In another example, nodes corresponding to users with ages greater than a reference age threshold (such as, 40 years old) are determined as candidate reference nodes.

Next, based on a supposition that elite users are more prone to get acquainted with elite users, the reference nodes may be determined according to similarities between nodes in a candidate network including the candidate reference nodes determined at step S302.

At step S304, a social intensity of each candidate reference node in the candidate network may be determined based on similarities between candidate reference nodes in a candidate network including the candidate reference node set. The candidate network includes nodes corresponding to candidate users determined at step S302 and nodes corresponding to groups that the candidate users join.

In some embodiments, to determine social intensities of the candidate reference nodes in the candidate network, the nodes in the candidate network may be mapped into a candidate social space based on the similarities between the nodes in the candidate network, each candidate reference node being mapped into a space point in the candidate social space. In the candidate social space, a space intensity of each space point may represent a social intensity between a candidate reference node corresponding to the space point and a candidate reference node represented by another space point in the candidate social space. An example of a process of determining, based on the similarities between the nodes in the candidate network, a social intensity of each node in the candidate network is explained in detail below with reference to FIG. 5.

Figure 4:
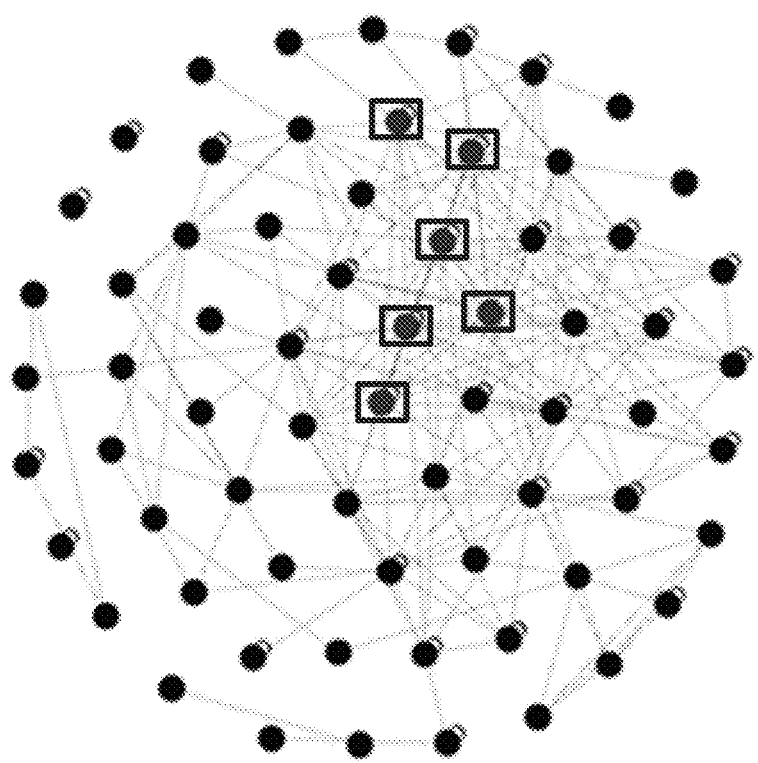
FIG. 4 is a schematic diagram of a candidate social space according to an embodiment of the present disclosure.

FIG. 4 is a schematic diagram of a candidate social space. As shown in FIG. 4, each point may represent a candidate reference node. It may be considered that a higher similarity between one point and another point indicates a higher intensity between the point and the another point. For example, a larger quantity of common friends between users corresponding to two candidate reference nodes indicates a higher similarity between the two candidate reference nodes, and an intensity between one of the candidate reference nodes and the other candidate reference node may be considered higher. A quantity of lines surrounding a point shown in FIG. 4 indicates an intensity between the point and another point. Therefore, based on the foregoing supposition that elite users are more prone to get acquainted with elite users, users represented by points in the social space with higher space intensities between the points and other space points may be determined as elite users. Candidate users with lower space intensities between points and other space points, even though features of elite users are met in terms of age, lack social interaction with other candidate elite users, and therefore do not meet the foregoing supposition that elite users are more prone to get acquainted with elite users, and are very probably not elite users. Therefore, by using the foregoing method, some users with higher social intensities in the candidate elite users are determined as elite users. For example, points in rectangular frames in FIG. 4 may represent points that are determined as elite users.

Returning to FIG. 3, as the social intensity of the each candidate reference node is determined at step S304, the reference nodes may be further determined from the candidate reference nodes according to the social intensity. At step S306, candidate reference nodes with social intensities greater than a reference social intensity threshold may be determined as the reference nodes. In some embodiments, the social intensity threshold may be a reference space intensity threshold.

Reference users may be further screened by repeating the method procedure in FIG. 3. For example, the method shown in FIG. 3 may be performed on a local social network formed by an enterprise community in the social network, to screen out reference users of the enterprise community. Further, based on screening results obtained by respectively performing the method shown in FIG. 3 on a plurality of enterprise communities, the method procedure shown in FIG. 3 may be repeated for a set of reference users screened out from the plurality of enterprise communities, and further screening results are determined as reference users in the entire social network.

Figure 5:
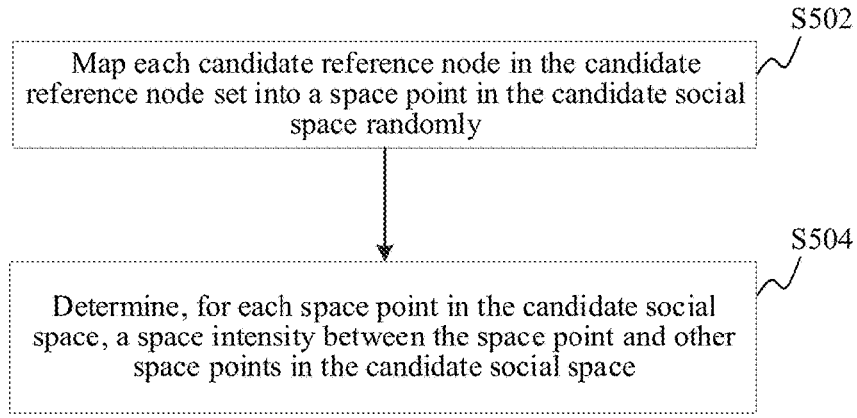
FIG. 5 is a schematic flowchart of a process of mapping a candidate reference node set into a candidate social space according to an embodiment of the present disclosure.

FIG. 5 is a schematic flowchart of a process of determining, based on similarities between nodes in the candidate network, a social intensity of each node in the candidate network according to an embodiment of the present disclosure.

As shown in FIG. 5, at step S502, each candidate reference node in the candidate reference node set may be mapped randomly into a space point in a candidate social space. For example, a space point corresponding to a candidate reference node in the candidate social space may be represented by using a vector. In an example, the vector may include 100 to 200 elements, and each element may have a random value. It may be understood that, a quantity of elements included in the vector may be set to any value according to an actual situation.

For each candidate reference node in the candidate reference node set, a spatial position of the space point corresponding to the candidate reference node in the candidate social space may be adjusted according to a target function, the target function representing a difference between a reference similarity and a similarity between the space point corresponding to the candidate reference node and a space point corresponding to a neighboring node of the candidate reference node.

In some embodiments, a similarity between a candidate reference node and a neighboring node of the candidate reference node is determined by using one or more of the following: a friend similarity between the candidate reference node and an individual user in neighboring nodes of the candidate reference node; and a group similarity between the candidate reference node and a group in the neighboring nodes of the candidate reference node.

The individual user in the neighboring nodes of the candidate reference node may represent a friend of a user corresponding to the candidate reference node. In the following description, such a node is referred to as a friend node. The group in the neighboring nodes of the candidate reference node may represent a group that the user corresponding to the candidate reference node joins. In the following description, such a neighboring node is referred to as a group node.

For a candidate reference node, a friend similarity between the candidate reference node and a friend node in neighboring nodes of the candidate reference node is determined based on a correlation between the candidate reference node and the friend node. The correlation may be determined by information such as common friends and positions of the candidate reference node and the friend node. A higher information similarity between the candidate reference node and the friend node indicates a higher correlation. For example, the friend similarity is determined by using the correlation between the candidate reference node and the friend node and correlations between the candidate reference node and a plurality of friend nodes of the candidate reference node. The plurality of friend nodes may be all friend nodes of the candidate reference node, or may be some of the friend nodes. The friend similarity is in positive correlation with ratios of the correlation between the candidate reference node and the friend node to the correlations between the candidate reference node and the plurality of friend nodes of the candidate reference node. Based on the definition above, for users corresponding to any two candidate reference nodes, a larger quantity of common friends between the users indicates a higher friend similarity between the users.

In some examples, for an $i^{th}$ candidate reference node and a $j^{th}$ friend node of the $i^{th}$ candidate reference node, a correlation between the $i^{th}$ candidate reference node and the $j^{th}$ friend node of the $i^{th}$ candidate reference node may be represented as $A_{ij}=u_j^T \cdot u_i$, $u_i$ is a vector for representing a space point of the candidate reference node in the candidate social space, and $u_j$ is a vector for representing a space point of the $j^{th}$ friend node of the $i^{th}$ candidate reference node in the candidate social space.

Therefore, a similarity between the $i^{th}$ candidate reference node and the $j^{th}$ friend node of the $i^{th}$ candidate reference node may be represented by the following formula:

$$p(u_j \mid u_i) = \frac{\exp(u_j^T \cdot u_i)}{\sum_{k=1}^{|V|} \exp(u_k^T \cdot u_i)}$$

where k is an index number, and V is a quantity of a plurality of friend nodes of the $i^{th}$ candidate reference node.

In some other examples, the correlation between the $i^{th}$ candidate reference node and the $j^{th}$ friend node of the $i^{th}$ candidate reference node may alternatively be represented as a variant of $$u_j^T \cdot u_i.$$

For example, the correlation may be represented as $$A_{ij} = \exp(u_j^T \cdot u_i).$$

Correspondingly, the similarity between the $i^{th}$ candidate reference node and the $j^{th}$ friend node of the $i^{th}$ candidate reference node may alternatively be represented as follows:

$$p(u_j \mid u_i) = \frac{(u_j^T \cdot u_i)}{\sum_{k=1}^{|V|} (u_k^T \cdot u_i)}$$

where k is an index number, and V is a quantity of a plurality of friend nodes of the $i^{th}$ candidate reference node.

Although only two exemplary function forms of the similarity between the $i^{th}$ candidate reference node and the $j^{th}$ friend node of the $i^{th}$ candidate reference node are given in the present disclosure, a person skilled in the art can understand that, the formula representing the similarity between friends may further be arbitrarily varied in accordance with the principle of the present disclosure. For example, a coefficient of any value in the foregoing formula representing the similarity between friends may be set according to an actual need or experience, to vary the formula.

By using the similarity between friends defined above, in the candidate social space, a loss function of the friend similarity of the $i^{th}$ candidate reference node may be defined as follows:

$$L_{pp} = \sum_{(u_i, u_j) \in E_{pp}} d(\hat{p}(u_j | u_i), p(u_j | u_i))$$

where $L_{pp}$ is a set of the plurality of friend nodes of the $i^{th}$ candidate reference node, and $\hat{p}(u_j|u_i)$ is a reference similarity between the $i^{th}$ candidate reference node and the $j^{th}$ friend node of the $i^{th}$ candidate reference node. $d(\hat{p}(u_j|u_i), p(u_j|u_i))$ represents a distance between $p(u_j|u_i)$ and $\hat{p}(u_j|u_i)$. A value of d being closer to zero indicates that $p(u_j|u_i)$ is more approximate to $\hat{p}(u_j|u_i)$. For example, the distance may be represented as a KL (Kullback-Leibler, a person name) divergence between $p(u_j|u_i)$ and $\hat{p}(u_j|u_i)$, that is, a relative entropy.

In some embodiments, in the candidate social space, for the $i^{th}$ candidate reference node, links between individual users may be considered equally weighted in the candidate social space. Therefore, the reference similarity between the $i^{th}$ candidate reference node and the $j^{th}$ friend node of the $i^{th}$ candidate reference node may be defined as follows:

$$\hat{p}(u_j | u_i) = \frac{1}{V}$$

where V is the quantity of the plurality of friend nodes of the $i^{th}$ candidate reference node.

By adjusting a position of the space point corresponding to the $i^{th}$ candidate reference node in the candidate social space, $p(u_j|u_i)$ can be approximate to $\hat{p}(u_j|u_i)$.

In addition, for a candidate reference node, a group similarity between the candidate reference node and a group node in neighboring nodes of the candidate reference node may be determined based on a correlation between the candidate reference node and the group node. For example, the group similarity may be determined by using the correlation between the candidate reference node and the group node and a group importance of the group node.

In some examples, for an ith candidate reference node and a jth group node of the ith candidate reference node, a correlation between the ith candidate reference node and the jth group node of the ith candidate reference node may be represented as $Bij = v_j^T \cdot u_i$, $u_i$ is a vector for representing a space point of the ith candidate reference node in the candidate social space, and $v_j$ is a vector for representing a space point of the jth group node of the ith candidate reference node in the candidate social space. In some other examples, the correlation between the ith candidate reference node and the jth group node of the ith candidate reference node may be represented as a variant of $$v_j^T \cdot u_i.$$

For example, to map the ith candidate reference node and the jth group node of the ith candidate reference node to a range between 0 and 1, the correlation between the ith candidate reference node and the jth group node of the ith candidate reference node may be represented as follows:

$$p(u_i, v_j) = \frac{1}{1 + \exp(-v_j^T \cdot u_j)}$$

In addition, links between individual users may be supposed to be equally weighted in the candidate social space, but links between individual users and groups are not equally weighted. Therefore, a group weight may be marked by using a group importance, and a reference similarity between the ith candidate reference node and the jth group node of the ith candidate reference node is determined by using the group weight.

Therefore, in the candidate social space, a loss function of the group similarity of the ith candidate reference node is determined by using the correlation between the ith candidate reference node and the jth group node of the ith candidate reference node and a weight $W(p_i, g_j)$ between the jth group node and the $i^{th}$ candidate reference node. For example, the loss function of the group similarity may be defined as follows:

$$L_{pg} = \sum_{(u_i, u_j) \in E_{pg}} d(\hat{p}(u_i, v_j), p(u_i, v_j))$$

where Lpg is a set of a plurality of group nodes of the ith candidate reference node, and $\hat{p}(u_i, v_j)$ is the reference similarity between the ith candidate reference node and the jth group node of the ith candidate reference node. $d(\hat{p}(u_i, v_j), p(u_i, v_j))$ represents a distance between $p(u_i, v_j)$ and $\hat{p}(u_i, v_j)$. A value of d being closer to zero indicates that $p(u_i, v_j)$ is more approximate to $\hat{p}(u_i, v_j)$. For example, the distance may be represented as a KL divergence between $p(u_i, v_j)$ and $\hat{p}(u_i, v_j)$.

In some embodiments, for the ith candidate reference node, the reference similarity between the ith candidate reference node and the jth group node of the ith candidate reference node may be defined as follows:

$$\hat{p}(u_i, v_j) = \frac{W(p_i, g_j)}{\sum_{k \in E_{pg}} W(p_i, g_k)}$$

where $W(p_i, g_j)$ is the weight between the ith candidate reference node and the jth group node of the ith candidate reference node, and $W(p_i, g_j)$ may be defined as follows:

$$W(p_i, g_i) = \frac{W(g_j)}{\sum_{k \in E_{ij}} W(g_k)}$$

where $W(g_j)$ is a group importance of the jth group node, k is an index number, and Eij is a set of group nodes in neighboring nodes of the ith candidate reference node.

In some embodiments, the group importance may be determined by using at least one of a group density and a group activity level of the group nodes. The group density is determined based on a quantity of relationship chains between all individual users in the group and a quantity of all the individual users in the group, and the group activity level is determined based on a frequency that the group has reference behavior in a reference time period.

In some examples, the group density of the group node is determined based on a ratio of a quantity of current relationship chains between all the individual users in the group to a maximum quantity of relationship chains that can exist between all the individual users in the group.

For example, in a group including n individual users, if the n individual users are friends to each other, there may be n(n−1)/2 relationship chains in the group at most. If a quantity of relationship chains actually existing in the group is represented as L, a group density of the group may be represented as 2L/n(n−1).

It may be understood that, the group density of the group nodes may alternatively be represented as a variant of 2L/n(n−1) without departing from the principle of the present disclosure. For example, in some other examples, the group density of the group nodes may alternatively be represented as log 2L/log(n*(n−1)).

The group activity level of the group nodes may be represented as a frequency that the group has reference behavior in a reference time period. For example, for a chat group, the reference behavior may be chatting behavior or forwarding behavior in the chat group. For an official account, the reference behavior may be behavior that the official account publishes a new article. In some examples, the group activity level may be represented as a ratio of a quantity of days in which the group has the reference behavior in the reference time period to the reference time period. For example, if there is the reference behavior in five days in a latest week, the group activity level of the group may be represented as 5/7. In another example, if there is the reference behavior in 200 days in a latest year, the group activity level of the group may be represented as 200/365.

Therefore, in some embodiments, the group importance of the jth group node may be represented by the following formula:

$$W(g_i) = \alpha \frac{\log 2L}{\log n(n-1)} + \beta \frac{K}{7}$$

where $\alpha$ and $\beta$ are reference weight factors, used for adjusting importance degrees of the group density and the group importance, and K is a quantity of days in which the group has reference behavior in a latest week.

A representation manner of the group importance is not limited to the foregoing form without departing from the principle of the present disclosure. A person skilled in the art can replace the group importance with various variants according to an actual situation.

By using the loss function of the friend similarity and the loss function of the group similarity defined above, in some embodiments, a target function used for the ith candidate reference node may be defined as follows:

$$L = Z*L_{pp} + (1-Z)*L_{pg}$$

where Z is a parameter used for adjusting importance degrees of the friend similarity and the group similarity. A person skilled in the art may set Z between 0 and 1 according to an actual situation.

In some embodiments, a value of the target function may be adjusted by using a gradient descent algorithm. For example, for a candidate reference node, a position of a space point corresponding to the reference node in the candidate social space, that is, a parameter of a vector representing the space point, may be adjusted through a limited quantity of iterations to adjust the value of the target function, for example, the value of the target function is approximate to zero. The value of the target function being approximate to zero means that similarities between the ith candidate reference node and other neighboring nodes are approximate to the reference similarity. In some embodiments, a termination condition of iteration may be that a change of the adjusted vector parameter of the space point is less than a reference convergence threshold. In some other embodiments, the termination condition of iteration may be that a quantity of iterations reaches a reference maximum quantity.

By using the foregoing method, the candidate reference node set may be mapped into the candidate social space based on the similarity.

Then, at step S504, for each space point in the candidate social space, a space intensity between the space point and other space points in the candidate social space may be determined, the space intensity indicating a social intensity of a candidate reference node corresponding to the space point.

In some embodiments, space intensities between space points in the candidate social space may be determined based on an outlier detection algorithm. For example, the space intensities between the space points in the candidate social space may be determined based on the iForest technology.

In some examples, the candidate social space may be segmented by using a random hyperplane, and two subspaces may be generated each time the candidate social space is segmented. Then, each subspace is segmented by using a random hyperplane. The foregoing process is cyclically performed until each final obtained subspace includes only one space point.

It may be understood that, for a space point with a higher space intensity with other space points, a plurality of segmentations need to be performed to obtain a final subspace including the space point, but for a space point with a lower space intensity with other space points, only a fewer quantity of segmentations are required to generate a final subspace. Therefore, a quantity of segmentations required to obtain each final subspace including one space point may be recorded, and the quantity of segmentations required to generate the subspace including the space point is determined as a space intensity between the space point and other space points.

Figure 6:
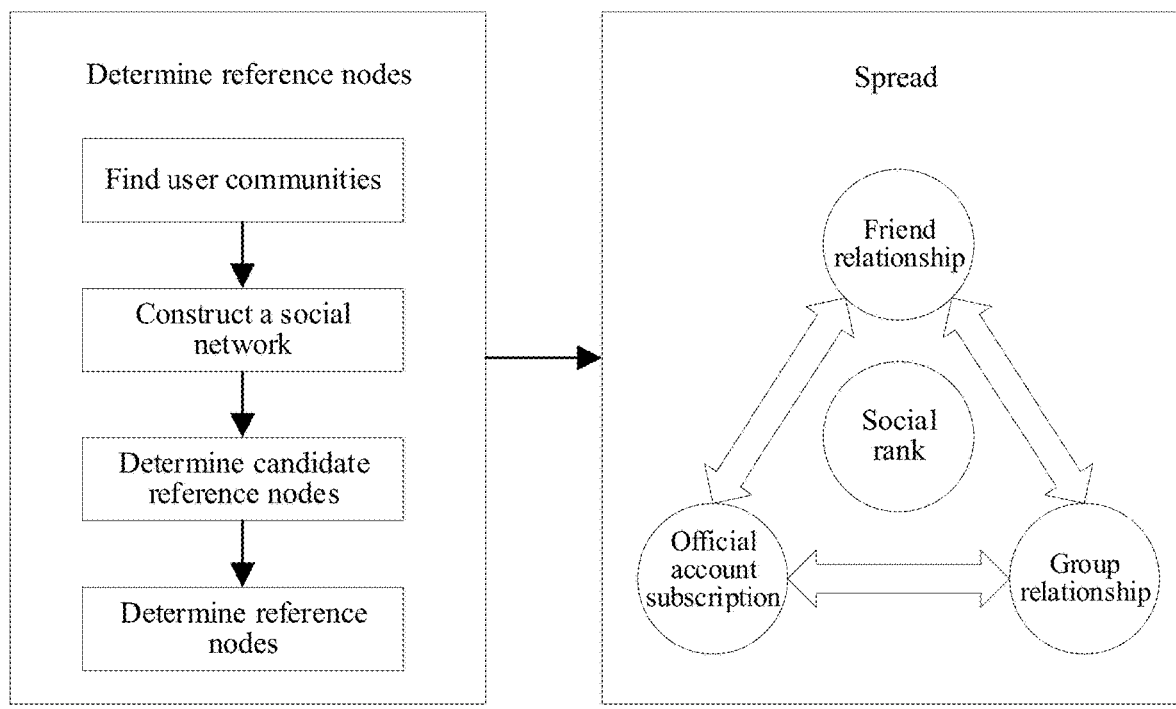
FIG. 6 is a schematic diagram of determining a social rank according to an embodiment of the present disclosure.

Referring to FIG. 6, a social network may be constructed based on found user communities in the present disclosure. The user communities may have a plurality of different types, for example, a relatively high-end enterprise community, a resident community at an intermediate level, and a school community at an ordinary level. There are usually a plurality of individual users and a plurality of groups including individual users in the user community. Therefore, the social network may be constructed based on social relationships between individual users and between individual users and groups, and each individual user or group is represented in the form of a node in the social network.

Figure 7:
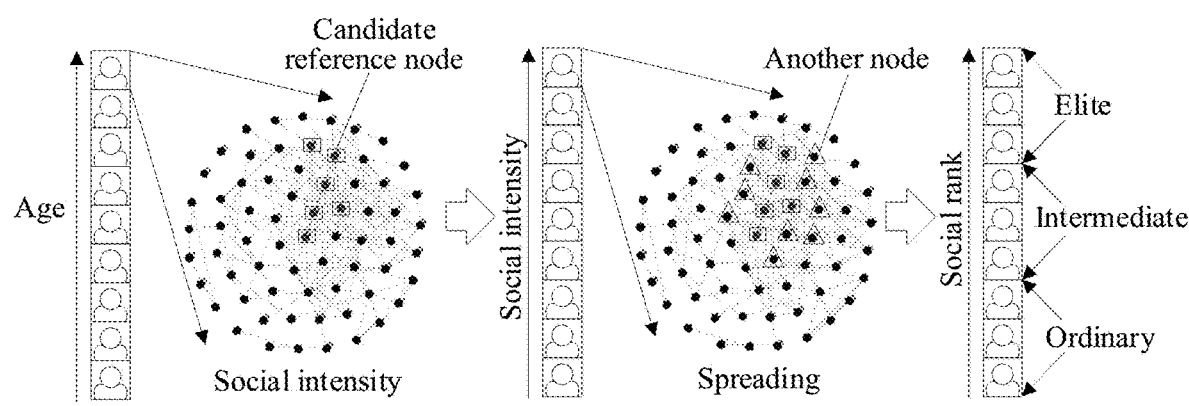
FIG. 7 is a schematic diagram of determining a social rank according to an embodiment of the present disclosure.

For the constructed social network, in the present disclosure, candidate reference nodes may be first determined from all nodes included in the social network, and then selection is performed in the candidate reference nodes, to obtain reference nodes. Referring to FIG. 7, in the present disclosure, candidate reference nodes may be determined from all the nodes based on ages of users corresponding to the nodes. Then, a social intensity of each candidate reference node may be determined, and selection is performed in the candidate reference nodes according to the social intensity to obtain reference nodes.

After the reference nodes are obtained, still referring to FIG. 6, based on the determined reference nodes, according to social relationships between the reference nodes and other nodes in the social network, social ranks of the other nodes may be determined by using social ranks of the reference nodes, and a user level corresponding to each node is determined based on a social rank of the node. The social relationships between the reference nodes and the other nodes in the social network may be one or more of a friend relationship, an official account subscription relationship, or a group relationship shown in FIG. 6. The manner of determining the social ranks of the other nodes based on social relationships between different nodes by using the social ranks of the reference nodes may be considered as spreading of the social ranks in the social network. Based on the spreading, all social ranks of users corresponding to the nodes included in the social network can be determined in the present disclosure, that is, coverage of all the users is implemented.

By using the method for determining a social rank of a node in a social network according to the present disclosure, based on social ranks of reference users, social ranks of other target users may be determined by using the social relationships in the social network. By considering both correlations between individual users and correlations between individual users and groups in the social network, social correlations between the nodes in the social network may be better described, so that the social ranks of the users in the social network may be estimated more accurately.

Figure 8A:
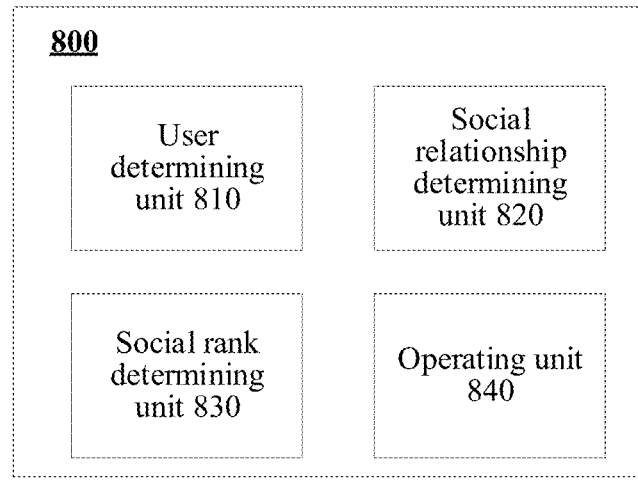
FIG. 8A is a block diagram of a device for determining a social rank of a node in a social network according to an embodiment of the present disclosure.

FIG. 8A shows a device for determining a social rank of a node in a social network according to an embodiment of the present disclosure. The social network includes a plurality of nodes connected by using relationship chains. As shown in FIG. 8A, the device 800 may include a user determining unit 810, a social relationship determining unit 820, and a social rank determining unit 830.

The user determining unit 810 may be configured to determine a user corresponding to at least one of the plurality of nodes in the social network. In this case, users may be ranked by using a social rank of each node. For example, social ranks of two nodes may be compared, and it is considered that a higher social rank of a node indicates a higher rank of a user corresponding to the node in the social network.

The social relationship determining unit 820 may be configured to determine a connection structure of the relationship chains between the plurality of nodes. As shown in FIG. 1, the social network includes a plurality of nodes connected to each other by using relationship chains. Therefore, connection manners of the relationship chains between the nodes may represent social modes of the nodes in the social network, and comprehensive social relationships related to the nodes in the social network can be obtained.

The social rank determining unit 830 may be configured to determine, according to the connection structure of the relationship chains between the plurality of nodes, a social rank of the user corresponding to the at least one of the plurality of nodes. Relationship chains reflect social relationships between a node and other nodes in the social network. Therefore, by using the method provided in the present disclosure, the user may be ranked based on the social relationships in the social network.

In some embodiments, the device 800 may further include an operating unit 840, configured to perform, for two nodes having the same social rank in the plurality of nodes, the same operation for users represented by the two nodes. After the social rank of the user is determined, a user specific operation may be performed based on the social rank of the user. For example, a plurality of nodes in a social network may be classified according to a result obtained by the method shown in FIG. 2B. For two nodes having the same social rank in the plurality of nodes (that is, values of the social ranks of the two nodes are the same or the social ranks of the two nodes are in the same class), the same operation, such as, distribution or recall of the same content, may be performed for users represented by the two nodes.

By using the method provided in the present disclosure, the rank of the user in the social network may be determined based on social relationships of each user in the social network, so that the user can be ranked, and characteristics of the user are depicted by using a ranking result.

Figure 8B:
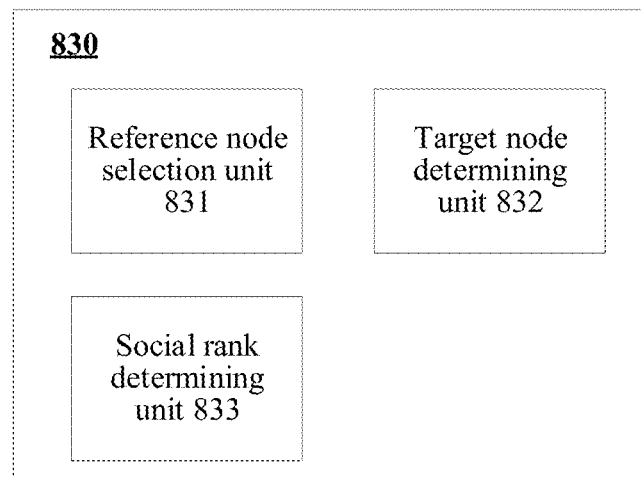
FIG. 8B is a schematic block diagram of a social rank determining unit according to an embodiment of the present disclosure.

FIG. 8B is a schematic block diagram of the social rank determining unit 830 according to an embodiment of the present disclosure. As shown in FIG. 8B, the social rank determining unit 830 may include a reference node selection unit 831, a target node determining unit 832, and a node rank determining unit 833.

The reference node selection unit 831 may be configured to select reference nodes in the social network based on a reference rule, and determine social ranks of the reference nodes as reference social ranks. In some embodiments, the reference nodes may include elite nodes, ordinary nodes, or a combination thereof. It may be understood that, in fact, any quantity of reference nodes may be selected in the social network according to a reference condition, and social ranks of the reference nodes are determined as the same or different reference values.

In some embodiments, the reference node selection unit 831 may be configured to directly determine a node as a reference node based on a preset condition. For example, when a user corresponding to a node meets one or more of the following: an age being greater than a reference threshold, a position being higher than a reference threshold, and an income being greater than a reference threshold, the node may be directly determined as an elite node. In another example, when a user corresponding to a node meets one or more of the following: living in a specific city, having no job, an income being less than a threshold, and having a bad credit record, the node may be directly determined as an ordinary node.

In some other embodiments, the reference node selection unit 831 may be configured to select some of the plurality of nodes in the social network as candidate reference nodes based on a candidate condition, and determine one or more of the nodes as reference nodes according to similarities between the candidate reference nodes.

The target node determining unit 832 may be configured to determine a target node in the social network according to the reference nodes. In some embodiments, all the nodes in the social network except the reference nodes may be determined as target nodes. In some other embodiments, some of the nodes in the social network except the reference nodes may be determined as target nodes.

The node rank determining unit 833 may be configured to determine a social rank of the target node based on relationship chains between the target node and the reference nodes and the reference social rank. For example, the social rank of the target node may be determined according to the social ranks of the reference nodes selected in the social network by the reference node selection unit 831 and relationship chains between the target node and the reference nodes. In some embodiments, an average value of social ranks of neighboring nodes of the target node may be determined as the social rank of the target node. For example, an average value of social ranks of all friends of the target node may be determined as the social rank of the target node. The average value mentioned herein may be any statistical average value such as an arithmetic average value, a geometric average value, a square mean, a harmonic average value, or a weighted average value.

When the social rank of the neighboring node of the target node is determined, if the neighboring node is a reference node, the social rank of the neighboring node is set to a reference value. If the neighboring node is not a reference node, the social rank of the neighboring node may be set to a default value. For example, the reference nodes include elite nodes having the first reference value, and then the default value may be set to any value less than the first reference value. If the reference nodes include ordinary nodes having the second reference value, and then the default value may be set to any value greater than the second reference value. If the reference nodes include both an elite node having the first reference value and an ordinary node having the second reference value, and then the default value may be set to any value greater than the second reference value and less than the first reference value.

In some implementations, when the social rank of the target node is determined, a limited quantity of iterations may be performed. In other words, all the target nodes in the social network may be processed to determine the social ranks of the target nodes. Then, the social ranks of the processed target nodes may be updated to a result of the processing, and based on the updated result, the social ranks of the target nodes are determined according to social ranks of neighboring nodes of the target nodes.

For example, during the first processing, the social ranks of the reference nodes in the social network are determined to be the reference value (such as, the first reference value 1 and the second reference value 0 mentioned above), and social ranks of other nodes are determined to be the default value. During the second processing, the social ranks of the other nodes in the social network may be updated to a result obtained after the first processing. The rest may be deduced by analogy.

By using the device for determining a social rank of a node in a social network according to the present disclosure, the social ranks of the other nodes in the social network may be determined according to the relationship chains in the social network and the reference social ranks of the reference nodes, so that the social rank of the user is estimated more comprehensively.

Figure 9:
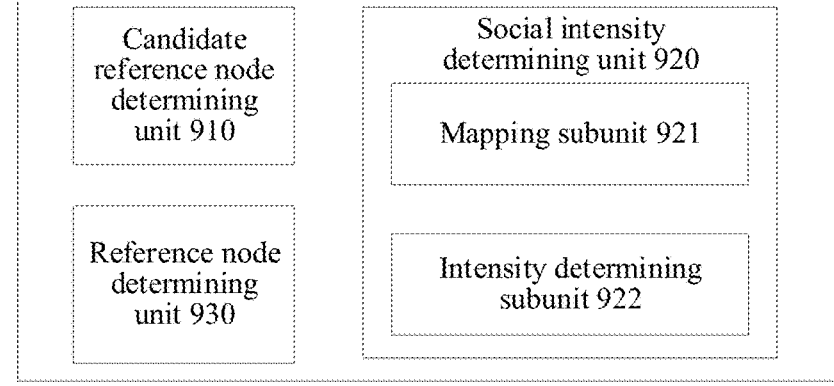
FIG. 9 is a schematic block diagram of a reference node selection unit according to an embodiment of the present disclosure.

FIG. 9 is a schematic block diagram of the reference node selection unit 831 according to an embodiment of the present disclosure.

As shown in FIG. 9, the reference node selection unit 831 may include a candidate reference node determining unit 910, a social intensity determining unit 920, and a reference node determining unit 930.

The candidate reference node determining unit 910 may be configured to determine a plurality of nodes conforming to a candidate condition in the social network as a candidate reference node set. In some embodiments, the candidate condition may be that a user age corresponding to a node is greater than a reference threshold. Next, the reference nodes may be determined according to social correlations in a candidate network including the determined candidate reference nodes.

The social intensity determining unit 920 may be configured to determine, based on similarities between the candidate reference nodes in the candidate network including the candidate reference node set, a social intensity of each candidate reference node in the candidate network.

In some embodiments, to determine social intensities of the candidate reference nodes in the candidate network, the nodes in the candidate network may be mapped into a candidate social space based on the similarities between the nodes in the candidate network, each candidate reference node being mapped into a space point in the candidate social space. In the candidate social space, a space intensity of each space point may represent a social intensity between a candidate reference node corresponding to the space point and another space point in the candidate social space.

As shown in FIG. 9, the social intensity determining unit 920 may include a mapping subunit 921 and a space intensity determining unit 922.

The mapping subunit 921 may be configured to map the candidate reference node set into a candidate social space based on the similarities, each candidate reference node being mapped into a space point in the candidate social space.

The mapping subunit 921 may be further configured to map each candidate reference node in the candidate reference node set into a space point in the candidate social space randomly, to map the candidate reference node set into the candidate social space. For example, a space point corresponding to a candidate reference node in the candidate social space may be represented by using a vector. In an example, the vector may include 100 to 200 elements, and each element may have a random value.

The mapping subunit 921 may be further configured to adjust, for each candidate reference node in the candidate reference node set, a spatial position of the space point corresponding to the candidate reference node in the candidate social space according to a target function, the target function representing a difference between a reference similarity and a similarity between the space point corresponding to the candidate reference node and a space point corresponding to a neighboring node of the candidate reference node.

In some embodiments, a similarity between a candidate reference node and a neighboring node of the candidate reference node is determined by using one or more of the following: a friend similarity between the candidate reference node and an individual user in neighboring nodes of the candidate reference node; and a group similarity between the candidate reference node and a group in the neighboring nodes of the candidate reference node.

The individual user in the neighboring nodes of the candidate reference node may represent a friend of a user corresponding to the candidate reference node. In the following description, such a node is referred to as a friend node. The group in the neighboring nodes of the candidate reference node may represent a group that the user corresponding to the candidate reference node joins. In the following description, such a neighboring node is referred to as a group node.

For a candidate reference node, a friend similarity between the candidate reference node and a friend node in neighboring nodes of the candidate reference node is determined based on a correlation between the candidate reference node and the friend node. For example, the friend similarity is determined by using a correlation between the candidate reference node and the friend node and correlations between the candidate reference node and a plurality of friend nodes of the candidate reference node. The friend similarity is in positive correlation with ratios of the correlation between the candidate reference node and the friend node to the correlations between the candidate reference node and the plurality of friend nodes of the candidate reference node. The plurality of friend nodes may be all friend nodes of the node, or may be some of the friend nodes. Based on the definition above, for users corresponding to any two candidate reference nodes, a larger quantity of common friends between the users indicates a higher friend similarity between the users.

In some examples, for an ith candidate reference node and a jth friend node of the ith candidate reference node, a correlation between the ith candidate reference node and the jth friend node of the ith candidate reference node may be represented as $$Aij = u_j^T \cdot u_i.$$

u is a vector for representing a space point of the node in the candidate social space.

Therefore, a similarity between the ith candidate reference node and the jth friend node of the ith candidate reference node may be represented by the following formula:

$$p(u_j \mid u_i) = \frac{\exp(u_j^T \cdot u_i)}{\sum_{k=1}^{|V|} \exp(u_k^T \cdot u_i)}$$

where k is an index number, and V is a quantity of a plurality of friend nodes of the ith candidate reference node.

In some other examples, the correlation between the ith candidate reference node and the jth friend node of the ith candidate reference node may alternatively be represented as a variant of $$u_j^T \cdot u_i.$$

For example, the correlation may be represented as $$Aij = \exp(u_j^T \cdot u_i).$$

Correspondingly, the similarity between the ith candidate reference node and the jth friend node of the ith candidate reference node may alternatively be represented as follows:

$$p(u_j \mid u_i) = \frac{(u_j^T \cdot u_i)}{\sum_{k=1}^{|V|} (u_k^T \cdot u_i)}$$

where k is an index number, and V is a quantity of a plurality of friend nodes of the ith candidate reference node.

Although only two exemplary function forms of the similarity between the ith candidate reference node and the jth friend node of the ith candidate reference node are given in the present disclosure, a person skilled in the art can understand that, the formula representing the similarity between friends may further be arbitrarily varied in accordance with the principle of the present disclosure.

By using the similarity between friends defined above, in the candidate social space, a loss function of the friend similarity of the ith candidate reference node may be defined as follows:

$$L_{pp} = \sum_{(u_i, u_j) \in E_{pp}} d(\hat{p}(u_j \mid u_i), p(u_j \mid u_i))$$

where $L_{pp}$ is a set of all friend nodes of the ith candidate reference node, and $\hat{p}(u_j \mid u_i)$ is a reference similarity between the ith candidate reference node and the jth friend node of the ith candidate reference node. $d(\hat{p}(u_j \mid u_i), p(u_j \mid u_i))$ represents a distance between $p(u_j \mid u_i)$ and $\hat{p}(u_j \mid u_i)$. A value of d being closer to zero indicates that $p(u_j \mid u_i)$ is more approximate to $\hat{p}(u_j \mid u_i)$. For example, the distance may be represented as a KL divergence between $p(u_j \mid u_i)$ and $\hat{p}(u_j \mid u_i)$.

In some embodiments, in the candidate social space, for the ith candidate reference node, links between individual users may be considered equally weighted in the candidate social space. Therefore, the reference similarity between the ith candidate reference node and the jth friend node of the ith candidate reference node may be defined as follows:

$$\hat{p}(u_j \mid u_i) = \frac{1}{V}$$

where V is the quantity of all the friend nodes of the ith candidate reference node.

By adjusting a position of a space point corresponding to the ith candidate reference node in the candidate social space, $p(u_j \mid u_i)$ can be approximate to $\hat{p}(u_j \mid u_i)$.

In addition, for a candidate reference node, a group similarity between the candidate reference node and a group node in neighboring nodes of the candidate reference node may be determined based on a correlation between the candidate reference node and the group node. For example, the group similarity may be determined by using the correlation between the candidate reference node and the group node and a group importance of the group node.

In some examples, for an ith candidate reference node and a jth group node of the ith candidate reference node, a correlation between the ith candidate reference node and the jth group node of the ith candidate reference node may be represented as $$Bij = v_j^T \cdot u_i . u_i$$

is a vector for representing a space point of the ith candidate reference node in the candidate social space, and $v_j$ is a vector for representing a space point of the group node of the ith candidate reference node in the candidate social space. In some other examples, the correlation between the ith candidate reference node and the jth group node of the ith candidate reference node may be represented as a variant of $$v_j^T \cdot u_i.$$

For example, to map the ith candidate reference node and the jth group node of the ith candidate reference node to a range between 0 and 1, the correlation between the ith candidate reference node and the jth group node of the $i^{th}$ candidate reference node may be represented as follows:

$$p(u_i, v_j) = \frac{1}{1 + \exp(-v_j^T \cdot u_i)}$$

In addition, links between individual users may be supposed to be equally weighted in the candidate social space, but links between individual users and groups are not equally weighted. Therefore, a group weight may be marked by using a group importance, and a reference similarity between the ith candidate reference node and the jth group node of the ith candidate reference node is determined by using the group weight.

Therefore, in the candidate social space, a loss function of the group similarity of the ith candidate reference node is determined by using the correlation between the ith candidate reference node and the jth group node of the ith candidate reference node and a weight $W(p_i, g_j)$ between the jth group node and the ith candidate reference node. For example, the loss function of the group similarity may be defined as follows:

$$L_{pg} = \sum_{(u_i, u_j) \in E_{pg}} d(\hat{p}(u_i, v_j), p(u_i, v_j))$$

where Lpg is a set of all group nodes of the ith candidate reference node, and $\hat{p}(u_i, v_j)$ is the reference similarity between the ith candidate reference node and the jth group node of the ith candidate reference node. $d(\hat{p}(u_i, v_j), p(u_i, v_j))$ represents a distance between $p(u_i, v_j)$ and $\hat{p}(u_i, v_j)$. A value of d being closer to zero indicates that $p(u_i, v_j)$ is more approximate to $\hat{p}(u_i, v_j)$. For example, the distance may be represented as a KL divergence between $p(u_i, v_j)$ and $\hat{p}(u_i, v_j)$.

In some embodiments, for the ith candidate reference node, the reference similarity between the ith candidate reference node and the jth group node of the ith candidate reference node may be defined as follows:

$$\hat{p}(u_i, v_j) = \frac{W(p_i, g_j)}{\sum_{k \in E_{pg}} W(p_i, g_k)}$$

where $W(p_i, g_j)$ is the weight between the ith candidate reference node and the jth group node of the ith candidate reference node, and $W(p_i, g_j)$ may be defined as follows:

$$W(p_i, g_i) = \frac{W(g_i)}{\sum_{k \in E_{ij}} W(g_k)}$$

where $W(g_j)$ is a group importance of the jth group node, k is an index number, and Eij is a set of group nodes in neighboring nodes of the ith candidate reference node.

In some embodiments, the group importance may be determined by using at least one of a group density and a group activity level of the group nodes. The group density is determined based on a quantity of relationship chains between all individual users in the group and a quantity of all the individual users in the group, and the group activity level is determined based on a frequency that the group has reference behavior in a reference time period.

In some examples, the group density of the group node is determined based on a ratio of a quantity of current relationship chains between all the individual users in the group to a maximum quantity of relationship chains that can exist between all the individual users in the group.

For example, in a group including n individual users, if the n individual users are friends to each other, there may be n(n−1)/2 relationship chains in the group at most. If a quantity of relationship chains actually existing in the group is represented as L, a group density of the group may be represented as 2L/n(n−1).

It may be understood that, the group density of the group nodes may alternatively be represented as a variant of 2L/n(n−1) without departing from the principle of the present disclosure. For example, in some other examples, the group density of the group nodes may alternatively be represented as log 2L/log(n*(n−1)).

The group activity level of the group nodes may be represented as a frequency that the group has reference behavior in a reference time period. For example, for a chat group, the reference behavior may be chatting behavior or forwarding behavior in the chat group. For an official account, the reference behavior may be behavior that the official account publishes a new article. In some examples, the group activity level may be represented as a ratio of a quantity of days in which the group has the reference behavior in the reference time period to the reference time period. For example, if there is the reference behavior in five days in a latest week, the group activity level of the group may be represented as 5/7. In another example, if there is the reference behavior in 200 days in a latest year, the group activity level of the group may be represented as 200/365.

Therefore, in some embodiments, the group importance of the jth group node may be represented by the following formula:

$$W(g_i) = \alpha \frac{\log 2L}{\log n(n-1)} + \beta \frac{K}{7}$$

where α and β are reference weight factors, used for adjusting importance degrees of the group density and the group importance, and K is a quantity of days in which the group has the reference behavior in a latest week.

A representation manner of the group importance is not limited to the foregoing form without departing from the principle of the present disclosure. A person skilled in the art can replace the group importance with various variants according to an actual situation.

Therefore, in some embodiments, a target function between the ith candidate reference node and a neighboring node of the ith candidate reference node may be defined as follows:

$$L = Z * L_{pp} + (1-Z) * L_{pg}$$

where Z is a parameter used for adjusting importance degrees of the friend similarity and the group similarity. A person skilled in the art may set Z between 0 and 1 according to an actual situation.

In some embodiments, a value of the target function may be adjusted by using a gradient descent algorithm. For example, for a candidate reference node, a position of a space point corresponding to the reference node in the candidate social space, that is, a parameter of a vector representing the space point, may be adjusted through a limited quantity of iterations to adjust the value of the target function, for example, the value of the target function is approximate to zero. The value of the target function being approximate to zero means that similarities between the ith candidate reference node and other neighboring nodes are approximate to the reference similarity. In some embodiments, a termination condition of iteration may be that a change of the adjusted vector parameter of the space point is less than a reference convergence threshold. In some other embodiments, the termination condition of iteration may be that a quantity of iterations reaches a reference maximum quantity.

The space intensity determining unit 922 may be configured to determine, for each space point in the candidate social space, a space intensity between the space point and other space points in the candidate social space, the space intensity indicating a social intensity of a candidate reference node corresponding to the space point.

In some embodiments, space intensities between points in the candidate social space may be determined based on an outlier detection algorithm. For example, the space intensities between the space points in the candidate social space may be determined based on the iForest technology.

In some examples, the candidate social space may be segmented by using a random hyperplane, and two subspaces may be generated each time the candidate social space is segmented. Then, each subspace is segmented by using a random hyperplane. The foregoing process is cyclically performed until each final obtained subspace includes only one space point.

It may be understood that, for a space point with a higher space intensity with other space points, a plurality of segmentations need to be performed to obtain a final subspace including the space point, but for a space point with a lower space intensity with other space points, only a fewer quantity of segmentations are required to generate a final subspace. Therefore, a quantity of segmentations required to obtain each final subspace including one space point may be recorded, and the quantity of segmentations required to generate the subspace including the space point is determined as a space intensity between the space point and other space points.

The reference node determining unit 930 may be configured to determine nodes with social intensities greater than a reference social intensity threshold as the reference nodes. In some embodiments, the social intensity threshold may be a reference space intensity threshold. For example, the space intensity threshold may be a threshold of a quantity of segmentations required to generate a subspace including the space point.

By using the device for determining a social rank of a node in a social network according to the present disclosure, based on social ranks of reference users, social ranks of other target users may be determined by using the social relationships in the social network. By considering both correlations between individual users and correlations between individual users and groups in the social network, social correlations between the nodes in the social network may be better described, so that the social ranks of the users in the social network may be estimated more accurately.

Figure 10:
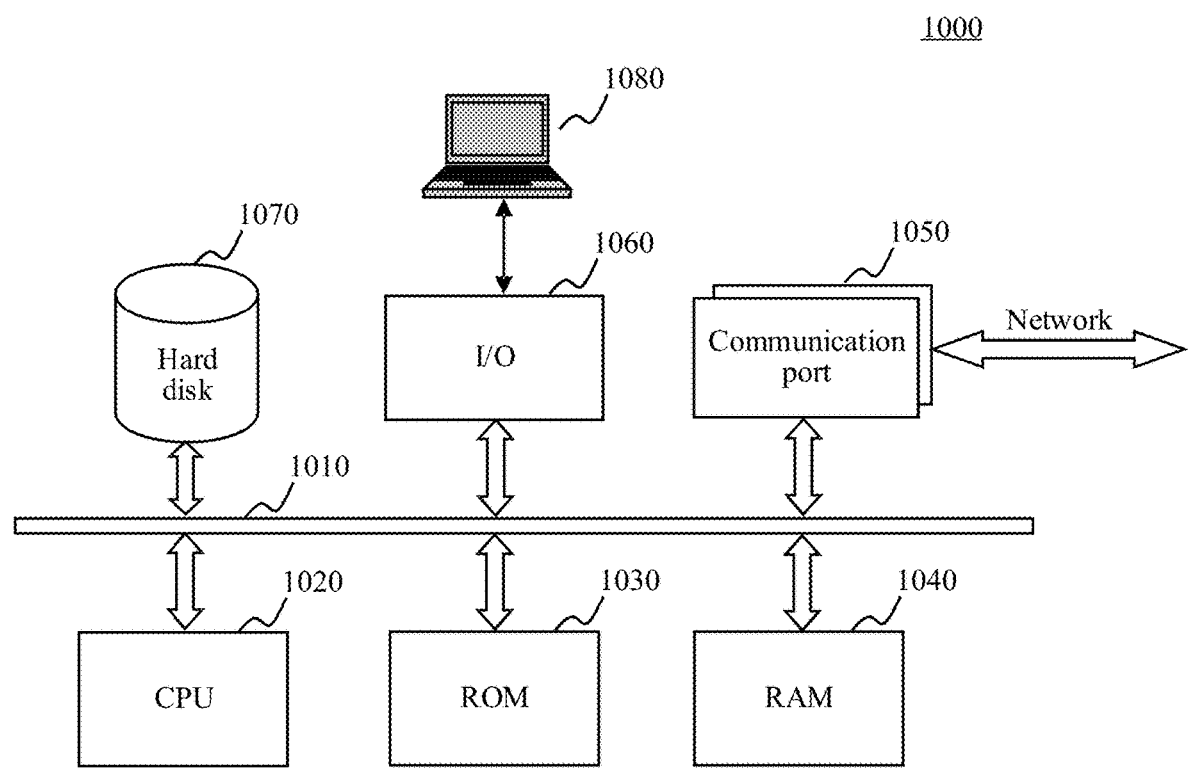
FIG. 10 shows an architecture of an exemplary computing device according to an embodiment of the present disclosure.

In addition, the method or apparatus according to the embodiments of the present disclosure may alternatively be implemented by using an architecture of a computing device shown in FIG. 10. FIG. 10 shows an architecture of a computing device. As shown in FIG. 10, the computing device 1000 may include a bus 1010, one or more CPU 1020, a read-only memory (ROM) 1030, a random access memory (RAM) 1040, a communication port 1050 connected to a network, an input/output component 1060, a hard disk 1070, and the like. A storage device, for example, the ROM 1030 or the hard disk 1070, in the computing device 1000 may store various data or files used in processing and/or communication in the method for determining a social rank of a node in a social network according to the present disclosure and program instructions executed by the CPU. The computing device 1000 may further include a user interface 10100. Certainly, the architecture shown in FIG. 10 is only exemplary, and when different devices are implemented, one or more components in the computing device shown in FIG. 10 may be omitted according to an actual need.

The embodiments of the present disclosure may alternatively be implemented as a computer-readable storage medium. Computer-readable instructions are stored on the computer-readable storage medium according to an embodiment of the present disclosure. The computer-readable instructions, when executed by a processor, may perform the method according to the embodiments of the present disclosure described with reference to the foregoing accompanying drawings. The computer-readable storage medium includes, but is not limited to, a volatile memory and/or a non-volatile memory. For example, the volatile memory may include a RAM and/or a cache. For example, the non-volatile memory may include a ROM, a hard disk, or a flash memory.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software. Each module/unit or submodule/subunit can be implemented using one or more processors (or processors and memory). Likewise, a processor (or processor and memory) can be used to implement one or more modules/units or submodules/subunits. Moreover, each module/unit may be developed using a computer programming language, or be part of an overall module/unit that is developed using a computer programming language to encompass the functionalities of each module/unit.

A person skilled in the art can understand that, content disclosed in the present disclosure may have various variations and improvements. For example, the devices or components described above may be implemented by using hardware, or may be implemented by using software, firmware, or a combination of some of or all of the software, the firmware, and the hardware.

Moreover, as shown in the present disclosure and the claims, words such as "a/an", "one", and/or "the" do not necessarily refer to singular forms and may also include plural forms, unless expressly specified otherwise. In general, terms "comprise" and "include" merely indicate including expressly-identified steps and/or elements. The steps and elements do not constitute an exclusive list. A method or a device may also include other steps or elements.

Moreover, although the present disclosure makes various references to some units in the system according to the embodiments of the present disclosure, any quantity of different units may be used and run on a client and/or a server. The units are only illustrative, and different aspects of the system and method may use different units.

Moreover, flowcharts are used in the present disclosure for illustrating operations performed by the system according to the embodiments of the present disclosure. It is to be understood that the foregoing or following operations are not necessarily strictly performed according to an particular order. For example, the operations may be performed in a reverse order, out of any particular order, or may be performed concurrently or simultaneously. Meanwhile, other operations may be added to the processes. Alternatively, one or more operations may be deleted from the processes.

Unless otherwise defined, all terms (including technical and scientific terms) used herein have the same meaning as commonly understood by one of ordinary skill in the art to which the present disclosure belongs. It is further to be understood that the terms such as those defined in commonly used dictionaries are to be interpreted as having meanings that are consistent with the meanings in the context of the related art, and are not to be interpreted in an idealized or extremely formalized sense, unless expressively so defined herein.

The above is description of the present disclosure, and is not to be considered as a limitation to the present disclosure. Although several exemplary embodiments of the present disclosure are described, a person skilled in the art may easily understand that, many changes can be made to the exemplary embodiments without departing from novel teaching and advantages of the present disclosure. Therefore, the changes are intended to be included within the scope of the present disclosure as defined by the claims. It is to be understood that, the above is description of the present disclosure, and is not to be considered to be limited by the disclosed specific embodiments, and modifications to the disclosed embodiments and other embodiments fall within the scope of the appended claims. The present disclosure is subject to the claims and equivalents thereof.

What is claimed is:

1. A method for determining a social rank of a node in a social network, the social network including a plurality of nodes connected by relationship chains, the method comprising:

determining a user corresponding to at least one of the plurality of nodes in the social network;

determining a connection structure of the relationship chains between the plurality of nodes;

determining a plurality of nodes conforming to a candidate condition in the social network as a candidate reference node set;

determining, based on similarities between candidate reference nodes in a candidate network comprising the candidate reference node set, a social intensity of each candidate reference node in the candidate network;

determining candidate reference nodes with social intensities greater than a reference social intensity threshold as the reference nodes;

determining social ranks of the reference nodes as reference social ranks; and determining, according to the connection structure of the relationship chains between the plurality of nodes, the selected reference nodes, and the reference social ranks, a social rank of the user corresponding to the at least one of the plurality of nodes, wherein the social intensity of the each candidate reference node in the candidate network is determined by:

mapping the candidate reference node set into a candidate social space based on the similarities;

segmenting the candidate social space by using a random hyperplane to generate a plurality of subspaces, wherein two subspaces are generated each time a segmentation on the candidate social space or a previously obtained subspace is performed, the segmentation is cyclically performed until each final obtained subspace includes only one space point; and determining, for each space point in the candidate social space, a quantity of the segmentations required to generate a subspace comprising the space point as a space intensity of the space point, the space intensity indicating a social intensity of a candidate reference node corresponding to the space point.

2. The method according to claim 1, wherein the determining, according to the connection structure of the relationship chains between the plurality of nodes, the social rank of the user corresponding to the at least one of the plurality of nodes comprises:

determining a target node in the social network according to the reference nodes; and determining a social rank of the target node based on relationship chains between the target node and the reference nodes and the reference social rank.

3. The method according to claim 2, further comprising:

after determining the social ranks of the target nodes for a first time, performing a limited quantity of iterations to determine updated social ranks of the target nodes based on the social ranks of the target nodes in a previous iteration.

4. The method according to claim 1, wherein the mapping the candidate reference node set into the candidate social space based on the similarities comprises:

mapping each candidate reference node in the candidate reference node set into a space point in the candidate social space randomly, wherein the space point of a corresponding candidate reference node is represented by a vector containing a plurality of elements with random values; and adjusting, for each candidate reference node in the candidate reference node set, a spatial position of the space point corresponding to the candidate reference node in the candidate social space according to a target function, the target function representing a difference between a reference similarity and a similarity between the space point corresponding to the candidate reference node and a space point corresponding to a neighboring node of the candidate reference node.

5. The method according to claim 4, wherein the similarity between the space point corresponding to the candidate reference node and the space point corresponding to the neighboring node of the candidate reference node is determined by one or more of the following:
   a friend similarity between the candidate reference node and a friend node in neighboring nodes of the candidate reference node; and
   a group similarity between the candidate reference node and a group node in the neighboring nodes of the candidate reference node, the friend node being a node representing a single individual user, and the group node representing a node of a group comprising a plurality of individual users.

6. The method according to claim 5, wherein the friend similarity between the candidate reference node and the friend node in the neighboring nodes of the candidate reference node is determined based on a correlation between the candidate reference node and the friend node.

7. The method according to claim 6, wherein the friend similarity between the candidate reference node and the friend node in the neighboring nodes of the candidate reference node is determined according to ratios of the correlation between the candidate reference node and the friend node to correlations between the candidate reference node and a plurality of friend nodes of the candidate reference node.

8. The method according to claim 5, wherein the group similarity between the candidate reference node and the group node in the neighboring nodes of the candidate reference node is determined based on a correlation between the candidate reference node and the group node.

9. The method according to claim 8, wherein the group similarity between the candidate reference node and the group node in the neighboring nodes of the candidate reference node is determined according to a correlation between the candidate reference node and the group node and a group importance of the group node, the group importance of the group node is determined based on at least one of a group density and a group activity level of the group node, the group density is determined based on a quantity of relationship chains between all individual users in the group node and a quantity of all the individual users in the group node, and the group activity level is determined based on a frequency that the group node has reference behavior in a reference time period.

10. The method according to claim 1, further comprising: performing, for two nodes having the same social rank in the plurality of nodes, identical operations for users represented by the two nodes.

11. The method according to claim 1, further comprising: updating, according to the determined social ranks of the neighboring users corresponding to neighboring nodes of the user, the social rank of the user corresponding to the at least one of the plurality of nodes.

12. A device for determining a social rank of a node in a social network, the social network including a plurality of nodes connected by relationship chains, the device comprising: a memory storing computer program instructions; and a processor coupled to the memory and configured to executing the computer program instructions and perform:
   determining a user corresponding to at least one of the plurality of nodes in the social network;
   determining a connection structure of the relationship chains between the plurality of nodes;
   determining a plurality of nodes conforming to a candidate condition in the social network as a candidate reference node set;
   determining, based on similarities between candidate reference nodes in a candidate network comprising the candidate reference node set, a social intensity of each candidate reference node in the candidate network;
   determining candidate reference nodes with social intensities greater than a reference social intensity threshold as the reference nodes;
   determining social ranks of the reference nodes as reference social ranks; and
   determining, according to the connection structure of the relationship chains between the plurality of nodes, the selected reference nodes, and the reference social ranks, a social rank of the user corresponding to the at least one of the plurality of nodes,
   wherein the social intensity of the each candidate reference node in the candidate network is determined by:
   mapping the candidate reference node set into a candidate social space based on the similarities;
   segmenting the candidate social space by using a random hyperplane to generate a plurality of subspaces, wherein two subspaces are generated each time a segmentation on the candidate social space or a previously obtained subspace is performed, the segmentation is cyclically performed until each final obtained subspace includes only one space point; and
   determining, for each space point in the candidate social space, a quantity of the segmentations required to generate a subspace comprising the space point as a space intensity of the space point, the space intensity indicating a social intensity of a candidate reference node corresponding to the space point.

13. The device according to claim 12, wherein the processor is further configured to perform:
   determining a target node in the social network according to the reference nodes; and
   determining a social rank of the target node based on relationship chains between the target node and the reference nodes and the reference social rank.

14. The device according to claim 12, wherein the processor is further configured to perform:
   mapping each candidate reference node in the candidate reference node set into a space point in the candidate social space randomly, wherein the space point of a corresponding candidate reference node is represented by a vector containing a plurality of elements with random values; and
   adjusting, for each candidate reference node in the candidate reference node set, a spatial position of the space point corresponding to the candidate reference node in the candidate social space according to a target function, the target function representing a difference between a reference similarity and a similarity between the space point corresponding to the candidate reference node and a space point corresponding to a neighboring node of the candidate reference node.

15. The device according to claim 14, wherein the similarity between the space point corresponding to the candidate reference node and the space point corresponding to the neighboring node of the candidate reference node is determined by one or more of the following:

a friend similarity between the candidate reference node and a friend node in neighboring nodes of the candidate reference node; and a group similarity between the candidate reference node and a group node in the neighboring nodes of the candidate reference node, the friend node being a node representing a single individual user, and the group node representing a node of a group comprising a plurality of individual users.

16. A non-transitory computer-readable storage medium storing instructions executable by at least one processor to perform:

determining a user corresponding to at least one of the plurality of nodes in a social network, the social network including a plurality of nodes connected by relationship chains;

determining a connection structure of the relationship chains between the plurality of nodes;

determining a plurality of nodes conforming to a candidate condition in the social network as a candidate reference node set;

determining, based on similarities between candidate reference nodes in a candidate network comprising the candidate reference node set, a social intensity of each candidate reference node in the candidate network;

determining candidate reference nodes with social intensities greater than a reference social intensity threshold as the reference nodes;

determining social ranks of the reference nodes as reference social ranks; and determining, according to the connection structure of the relationship chains between the plurality of nodes, the selected reference nodes, and the reference social ranks, a social rank of the user corresponding to the at least one of the plurality of nodes, wherein the social intensity of the each candidate reference node in the candidate network is determined by:

mapping the candidate reference node set into a candidate social space based on the similarities;

segmenting the candidate social space by using a random hyperplane to generate a plurality of subspaces, wherein two subspaces are generated each time a segmentation on the candidate social space or a previously obtained subspace is performed, the segmentation is cyclically performed until each final obtained subspace includes only one space point; and determining, for each space point in the candidate social space, a quantity of the segmentations required to generate a subspace comprising the space point as a space intensity of the space point, the space intensity indicating a social intensity of a candidate reference node corresponding to the space point.

* * * * *